United States Patent
Kao et al.

(10) Patent No.: US 9,194,490 B2
(45) Date of Patent: *Nov. 24, 2015

(54) MICRO-ELECTRO-MECHANICAL-SYSTEMS BASED HYDRAULIC CONTROL SYSTEM FOR A WET DUAL CLUTCH TRANSMISSION

(75) Inventors: Chi-Kuan Kao, Troy, MI (US); Farzad Samie, Franklin, MI (US); Chunhao J. Lee, Troy, MI (US); Dongxu Li, Warren, MI (US); Kumaraswamy V. Hebbale, Troy, MI (US); Andrew L. Bartos, Clarkston, MI (US); Kevin B. Rober, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1219 days.

This patent is subject to a terminal disclaimer.

(21) Appl. No.: 13/114,482

(22) Filed: May 24, 2011

(65) Prior Publication Data

US 2012/0090416 A1  Apr. 19, 2012

Related U.S. Application Data

(60) Provisional application No. 61/393,379, filed on Oct. 15, 2010.

(51) Int. Cl.
*F16D 25/10* (2006.01)
*F16H 3/00* (2006.01)
*F16K 31/00* (2006.01)
*F16H 61/688* (2006.01)
(Continued)

(52) U.S. Cl.
CPC .......... *F16H 61/688* (2013.01); *F16D 48/0206* (2013.01); *F16H 61/0251* (2013.01); *B60Y 2400/428* (2013.01); *B60Y 2400/4244* (2013.01); *F16D 2048/0209* (2013.01); *F16D 2048/0221* (2013.01); *F16D 2048/0281* (2013.01); *Y10T 74/19242* (2015.01); *Y10T 74/20024* (2015.01)

(58) Field of Classification Search
CPC ............ F16D 21/06; F16D 2021/0653; F16D 2021/0661; F16D 48/066; F16D 48/02; F16D 48/06; F16D 25/14; F16D 48/0206; F16D 2048/0281; F16D 2048/0221; F16H 45/02; F16H 2045/0294; F16H 61/143; F16H 63/46; F16H 61/688; B60K 2741/225; B60Y 2400/4244; F16K 99/0044
USPC ............. 192/3.58, 48.611, 85.63; 251/25, 57, 251/129.06
See application file for complete search history.

(56) References Cited

U.S. PATENT DOCUMENTS 6,494,804 B1  12/2002  Hunnicutt et al.
6,540,203 B1   4/2003  Hunnicutt
6,694,998 B1   2/2004  Hunnicutt
(Continued)

FOREIGN PATENT DOCUMENTS

WO    WO2010/056481    *  5/2010

*Primary Examiner* — Edwin A Young
*Assistant Examiner* — Colby M Hansen
(74) *Attorney, Agent, or Firm* — Quinn Law Group, PLLC

(57) ABSTRACT

A wet dual clutch transmission includes at least one hydraulic component and a pilot valve operably connected to the hydraulic component to actuate the hydraulic component. The pilot valve includes a Micro-Electro-Mechanical Systems (MEMS) based pressure differential actuator valve. The hydraulic component may include but is not limited to a first clutch and a second clutch of the wet dual clutch transmission, a lube regulator valve, an on/off solenoid, a synchronizing shift fork or a line pressure control valve.

10 Claims, 4 Drawing Sheets

(51) Int. Cl.
*F16D 48/02* (2006.01)
*F16H 61/02* (2006.01)

(56) References Cited

U.S. PATENT DOCUMENTS

| | | | |
|---|---|---|---|
| 6,755,761 B2 | 6/2004 | Hunnicutt et al. | |
| 7,210,502 B2 | 5/2007 | Fuller et | |
| 8,425,375 B2 | 4/2013 | Fukuda et al. | |
| 8,425,376 B2 | 4/2013 | Schoenek | |
| 8,578,764 B2 * | 11/2013 | Stefina | 73/115.02 |
| 8,844,694 B2 * | 9/2014 | Hebbale et al. | 192/48.601 |
| 8,844,702 B2 * | 9/2014 | Lee et al. | 192/85.63 |
| 8,845,491 B2 * | 9/2014 | Li et al. | 477/156 |
| 2003/0092526 A1 | 5/2003 | Hunnicutt et al. | |
| 2008/0006029 A1 * | 1/2008 | Kitou et al. | 60/459 |
| 2008/0234099 A1 | 9/2008 | Gierer et al. | |
| 2009/0159389 A1 | 6/2009 | Imediegwu | |
| 2010/0012195 A1 | 1/2010 | Hunnicutt | |
| 2010/0019177 A1 | 1/2010 | Luckevich | |
| 2010/0084031 A1 | 4/2010 | Hunnicutt | |
| 2010/0269609 A1 | 10/2010 | Ross et al. | |
| 2011/0056315 A1 | 3/2011 | Lundberg et al. | |
| 2012/0090416 A1 | 4/2012 | Kao et al. | |
| 2012/0090935 A1 * | 4/2012 | Samie et al. | 192/3.28 |
| 2012/0090948 A1 | 4/2012 | Lee et al. | |

* cited by examiner

MICRO-ELECTRO-MECHANICAL-SYSTEMS BASED HYDRAULIC CONTROL SYSTEM FOR A WET DUAL CLUTCH TRANSMISSION

CROSS-REFERENCE TO RELATED APPLICATIONS

This application claims the benefit if U.S. Provisional Patent Application Ser. No. 61/393,379, filed on Oct. 15, 2010, the disclosure of which is hereby incorporated by reference.

TECHNICAL FIELD

The invention generally relates to a wet dual clutch transmission for a vehicle, and more specifically to a Micro-Electro-Mechanical-Systems (MEMS) based hydraulic control for at least one hydraulically controlled component of the wet dual clutch transmission.

BACKGROUND

Vehicles include a powertrain that is comprised of an engine, multi-speed transmission, and a differential or final drive. The engine produces a torque, and the multi-speed transmission increases the overall operating speed range of the vehicle by permitting the engine to operate through its torque range a number of times. The multi-speed transmission may include any of several different styles of multi-speed transmission, including automatic transmissions, continuously variable transmissions manual transmissions, or dual clutch transmissions.

Dual clutch transmissions include a gearbox having a plurality of gears that are selectively combined to define a plurality of gear ratios. The plurality of gear ratios may be broken into a plurality of odd gear ratios and a plurality of even gear ratios. The odd gear ratios may define a first gear ratio, a third gear ratio and a fifth gear ratio. The plurality of even gear ratios may include a second gear ratio, a fourth gear ratio and a sixth gear ratio. The dual clutch transmission includes a clutch assembly having two separate clutches, a first clutch and a second clutch, to selectively drive the gear ratios. The first clutch drives the odd gear ratios, and the second clutch drives the even gear ratios. Shifting between the gear ratios may be accomplished while minimizing interruption of torque distribution to the differential by applying the torque from the engine to one clutch at the same time as the torque is being withdrawn from the other clutch.

The clutch assembly may include a wet clutch assembly. If the clutch assembly is a wet clutch assembly, the first clutch and the second clutch each include wet multi-plate clutches that are bathed in oil. If the clutch assembly is a wet clutch assembly, then the dual clutch transmission may be referred to as a wet dual clutch transmission.

Several of the operations of the wet dual clutch transmission are hydraulically controlled through a valve body. The valve body operates as a hydraulic control center that receives pressurized fluid from a main fluid pump. The pressurized fluid coming from the main fluid pump is regulated, and is used to control at least one hydraulically controlled component of the wet dual clutch transmission. The hydraulically controlled component of the wet dual clutch transmission may include, but is not limited to, actuation of the wet clutch assembly, control of a lube regulating valve for the wet clutch assembly, control of an on/off solenoid, actuation of a synchronizing shift fork, or actuation of a line pressure control valve.

SUMMARY

A wet dual clutch transmission for a vehicle is provided. The wet dual clutch transmission includes a hydraulic component and a pilot valve. The pilot valve includes at least one micro-electro-mechanical systems (MEMS) based device. The pilot valve is operably connected to the hydraulic component. The pilot valve is configured for actuating the hydraulic component. The wet dual clutch transmission further includes a regulating valve. The regulating valve is operably connected to the pilot valve. The regulating valve is connected to the hydraulic component and configured to direct fluid to the hydraulic component when actuated by the pilot valve.

A vehicle is also provided. The vehicle includes an engine configured for producing a torque, and a wet dual clutch transmission. The wet dual clutch transmission is coupled to the engine, and is configured for receiving the torque from the engine. The wet dual clutch transmission includes a hydraulic component and a pilot valve. The pilot valve includes at least one micro-electro-mechanical systems (MEMS) based device. The pilot valve is operably connected to the hydraulic component. The pilot valve is configured for actuating the hydraulic component. The wet dual clutch transmission further includes a regulating valve. The regulating valve is operably connected to the pilot valve. The regulating valve is connected to the hydraulic component and configured to direct fluid to the hydraulic component when actuated by the pilot valve.

Accordingly, the MEMS based device of the pilot valve is considerably smaller and lighter than traditional control valves currently used to control the hydraulic components of the wet dual clutch transmission.

The above features and advantages and other features and advantages of the present invention are readily apparent from the following detailed description of the best modes for carrying out the invention when taken in connection with the accompanying drawings.

DETAILED DESCRIPTION

Figure 1:
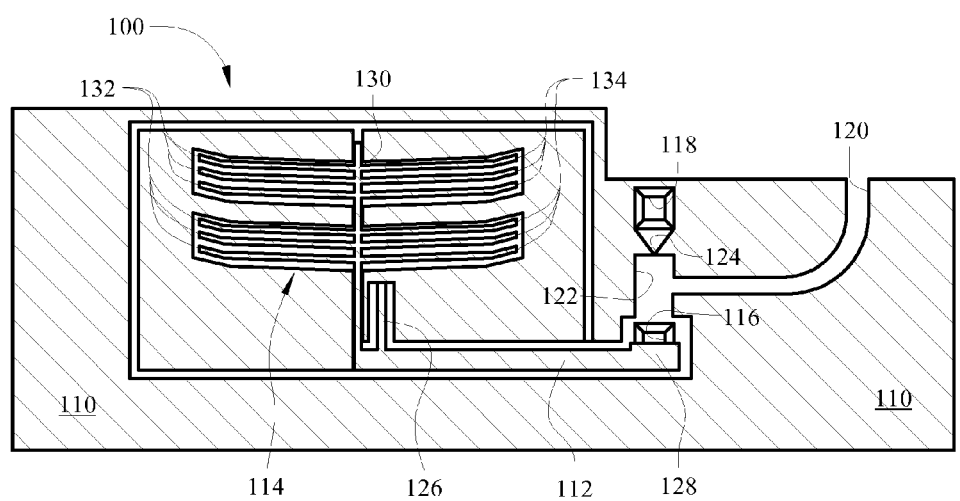
FIG. 1 is a schematic cross-sectional view of a Micro-Electro-Mechanical-Systems (MEMS) microvalve actuator.

Referring to the drawings, wherein like reference numbers correspond to like or similar components throughout the several figures, there is shown in FIG. 1 schematic cross-sectional view of a Micro-Electro-Mechanical-Systems (MEMS) pressure differential actuator valve, hereinafter referred to as a MEMS microvalve actuator 100. As discussed herein, the MEMS microvalve 100 may be used to effect hydraulic control over one or more hydraulic components, especially within a transmission. The MEMS microvalve 100 that is shown is only one type of a MEMS device that may be used as a control valve or control actuator for the hydraulic component.

While the present invention is described in detail with respect to automotive applications, those skilled in the art will recognize the broader applicability of the invention. Those having ordinary skill in the art will recognize that terms such as "above," "below," "upward," "downward," etc., are used descriptively for the figures, and do not represent limitations on the scope of the invention, as defined by the appended claims.

Generally, a MEMS based device may be considered to include a class of systems that are physically small, having features with sizes in the micrometer range. MEMS systems may have both electrical and mechanical components. MEMS devices are produced through micromachining processes. The term "micromachining" generally refers to the production of three-dimensional structures and moving parts through processes including modified integrated circuit (computer chip) fabrication techniques (such as chemical etching) and materials (such as silicon semiconductor material). The term "microvalve" as used herein generally refers to a valve having internal components and/or features with sizes in the micrometer range, and thus by definition is at least partially formed by micromachining. The term "microvalve device" as used in this application means a device that includes a microvalve, and that may include other components. MEMS devices may be operated in conjunction with other MEMS (micromachined) devices or components or may be used with standard sized (larger) components, such as those produced by mechanical machining processes.

The MEMS based device may be actuated to produce mechanical movement in any suitable manner, including but not limited to thermal actuation, electrostatic actuation, magnetic actuation, piezoelectric actuation or electrical actuation. Furthermore, the MEMS based device may include a shape memory alloy element for effecting mechanical moment within the MEMS device. The exemplary MEMS based device described in detail below is electrically actuated. However, it should be appreciated that the scope of the claims are not limited to an eclectically actuated MEMS device, and should be interpreted to include any MEMS based device actuated in any suitable manner.

The MEMS microvalve 100 includes a housing or body 110. The MEMS microvalve 100 may be formed from several layers of material, such as several semi-conductor wafers. The body 110 may also be formed from multiple layers. For example, and without limitation, the cross-sectioned portions shown may be taken through a middle layer of the MEMS microvalve 100 to show the body 110, with two other layers existing behind and in front of (relative to the view in FIG. 1) the middle layer shown. The other layers of the body 110 may include solid covers, port plates, or electrical control plates. However each of the layers is generally considered part of the body 110, except where separately identified.

The MEMS microvalve 100 includes a beam 112 actuated by a valve actuator 114. Selective control of the actuator 114 causes the beam 112 to selectively alter the flow of fluid between an inlet port 116 and an outlet port 118. By varying the fluid flow between the inlet port 116 and the outlet port 118, the MEMS microvalve 100 varies the pressure in a pilot port 120. As described herein, the pilot port 120 may be connected to additional valves or devices to effect hydraulic control thereof through a pilot signal which varies based upon the pressure in the pilot port 120.

Figure 3:
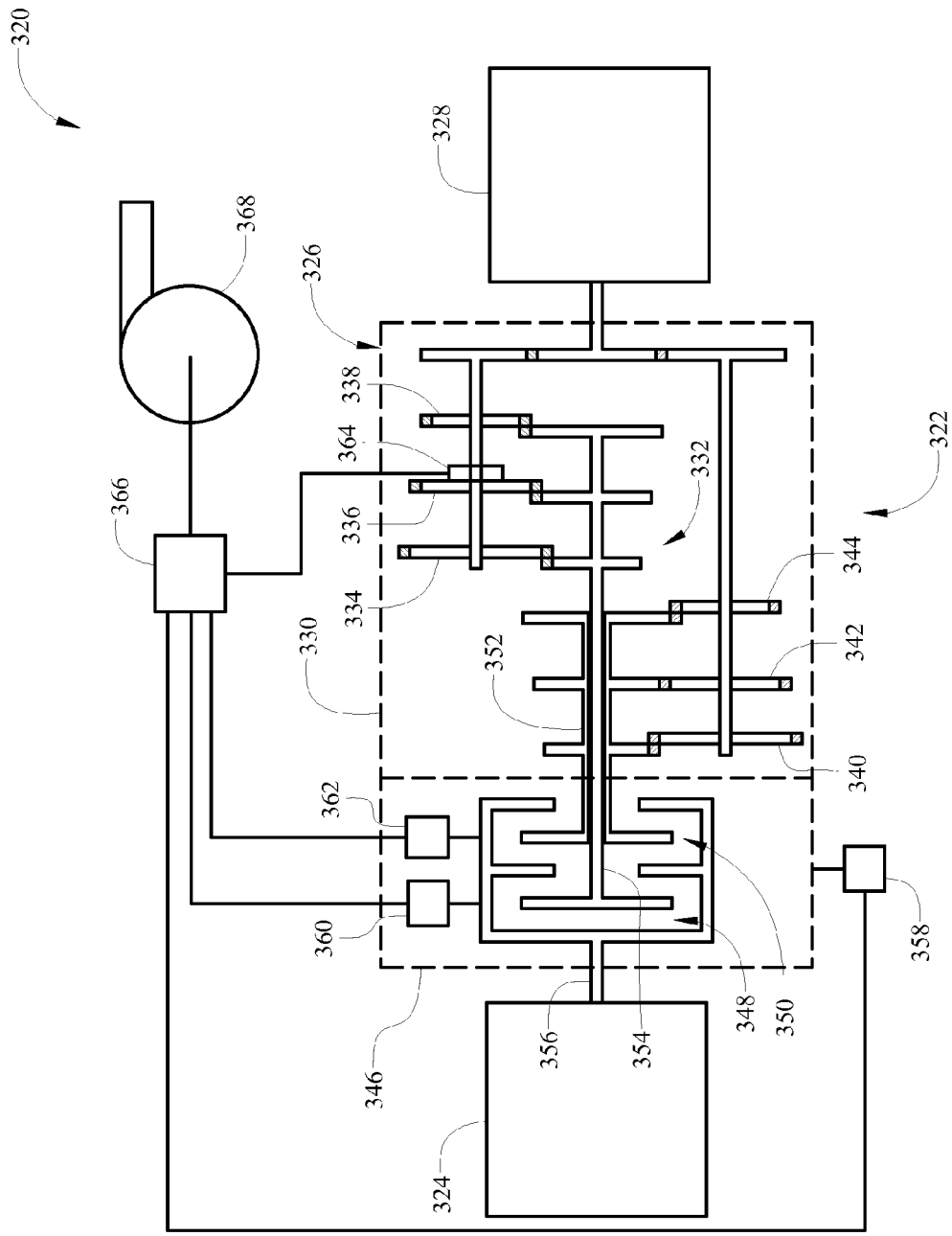
FIG. 3 is a schematic diagram of a vehicle showing a powertrain into which a pressure control system may be incorporated.

The inlet port 116 is connected to a source of high-pressure fluid such as a transmission pump (generally shown at 368 in FIG. 3). The outlet port 118 is connected to a low-pressure reservoir or fluid return (not shown). For purposes of the description herein, the outlet port 118 may be considered to be at ambient pressure, and acts as a ground or zero state in the MEMS microvalve 100.

The beam 112 moves in a continuously variable manner between a first position, illustrated in FIG. 1, a second position (not shown), and myriad intermediate positions. In the first position, the beam 112 does not completely block the inlet port 116. However, in the second position, the beam 112 blocks the inlet port 116 to prevent substantially all flow from the high-pressure fluid source.

A first chamber 122 is in fluid communication with both the inlet port 116 and the outlet port 118. However, communication between the outlet port 118 and the first chamber 122 (and also the inlet port 116) is restricted by an outlet orifice 124. High volume or fast fluid flow through the outlet orifice 124 causes a pressure differential to build between the first chamber 122 and the outlet port 118.

The beam 112 is pivotally mounted to a fixed portion of the body 110 by a flexure pivot 126. The opposite portion of the beam 112 from the flexure pivot 126 is a movable end 128, which moves up and down (as viewed in FIG. 1) to selectively, and variably, cover and uncover the inlet port 116.

When the beam 112 is in the second position, it allows little or no flow from the inlet port 116 to the first chamber 122. Any pressurized fluid in the first chamber 122 bleeds off through the outlet orifice 124 to the outlet port 118. As the beam 112 of the MEMS microvalve 100 is moved toward the first (open) position, the inlet port 116 is progressively uncovered, allowing faster flows of fluid from the inlet port 116 into the first chamber 122. The fast-flowing fluid cannot all be drained through the outlet orifice 124 and causes a pressure differential to form as the fluid flows through the outlet orifice 124, raising pressure in the first chamber 122.

As the inlet port 116 is further opened to the first position (as shown in FIG. 1), fluid gradually flows faster through the outlet orifice 124, causing a larger pressure differential and further raising the pressure in the first chamber 122. When the beam 112 is in the first position, it allows high flow from the inlet port 116 to the first chamber 122. Therefore, the pressure in the first chamber 122 can be controlled by controlling the rate of flow from the inlet port 116 through the first chamber 122 and the outlet orifice 124 to the outlet port 118. The position of the beam 112 controls the rate of flow of the fluid from the inlet port 116, and thus the pressure in the first chamber 122.

The valve actuator 114 selectively positions the beam 112. The actuator 114 includes an elongated spine 130 attached to the beam 112. The actuator 114 further includes a plurality of first ribs 132 and a plurality of second ribs 134, which are generally located on opposing sides of the elongated spine 130. Each of the first ribs 132 has a first end attached to a first side of the elongated spine 130 and a second end attached to the body 110. Similar to the first ribs 132, each of the second ribs 134 has a first end attached to the elongated spine 130 and a second end attached to the fixed portion of the body 110.

The elongated spine 130 and the first ribs 132 and the second ribs 134 may appear illustrated in FIG. 1 as disconnected from the body 110. However, the elongated spine 130, the first ribs 132, and the second ribs 134 are formed from the same material and are connected to the body 110 at some point in order to allow relative movement. However, the connection may be below the cross-sectioned plane shown in FIG. 1. Generally, the elongated spine 130, the first ribs 132, and the second ribs 134 may be considered the moving portions of the actuator 114.

The first ribs 132 and the second ribs 134 are configured to thermally expand (elongate) and contract (shrink) in response to temperature changes within the first ribs 132 and the second ribs 134. Electrical contacts (not shown) are adapted for connection to a source of electrical power to supply electrical current flowing through the first ribs 132 and the second ribs 134 to thermally expand the first ribs 132 and the second ribs 134.

The actuator 114 is adapted to be controlled by an electronic control unit (ECU) or other programmable device (not shown) which supplies variable current to the first ribs 132 and the second ribs 134. As the first ribs 132 and the second ribs 134 expand due to sufficient current flow, the elongated spine 130 moves or stretches downward (as viewed in FIG. 1), causing the beam 112 to rotate in the generally counterclockwise direction. The resulting movement of the beam 112 causes the moveable end 128 to move upward (as viewed in FIG. 1) and progressively block more of the inlet port 116.

Closing the inlet port 116 allows less (and eventually no) fluid to flow into the first chamber 122, decreasing the pressure therein as the fluid drains to the outlet port 118. Once the inlet port 116 is closed, the MEMS microvalve 100 is in the second position (not shown), and no pilot signal is being communicated through the pilot port 120.

As the flow of current drops, the first ribs 132 and the second ribs 134 contract and the elongated spine 130 moves upward (as viewed in FIG. 1), causing the beam 112 to rotate in the generally clockwise direction. The resulting movement of the beam 112 causes the moveable end 128 to move downward (as viewed in FIG. 1) and progressively open more of the inlet port 116.

Opening the inlet port 116 allows more fluid to flow into the first chamber 122, increasing the pressure therein as the fluid flow overcomes the ability of the outlet port 118 to drain fluid from the first chamber 122. Once the inlet port 116 is substantially open, the MEMS microvalve 100 is in the first position (shown in FIG. 1), and a strong pilot signal is being communicated through the pilot port 120.

In addition to the heat-actuated MEMS device shown in FIG. 1, other types of MEMS based actuators may be used in place of the MEMS microvalve 100 or in place of the actuator 114. Accordingly, the MEMS microvalve 100 is only an exemplary embodiment of a MEMS based device, i.e., a MEMS pressure differential actuator valve, and the scope of the claims is not limited to the exemplary embodiment of the MEMS pressure differential actuator valve shown and describe herein. In general, the micro-electro-mechanical system (MEMS) based device may include any device that has one or more electronic elements fabricated through an integrated circuit technique (e.g., etching on a silicon wafer) and one or more mechanical elements fabricated through a micromachining process (e.g., forming structures and moving parts with dimensions in the micrometer range). The electronic and mechanical elements may also be formed by other processes. In alternative or additional approaches, configurations, or embodiments, the MEMS-based device may include other elements with dimensions in the micrometer range, such as an electromagnetic field actuator, a piezoelectric amplifier, a thermal actuator, a pressure sensor, a gyroscope, an optical switch, other MEMS-based devices, or any combination thereof.

Figure 2:
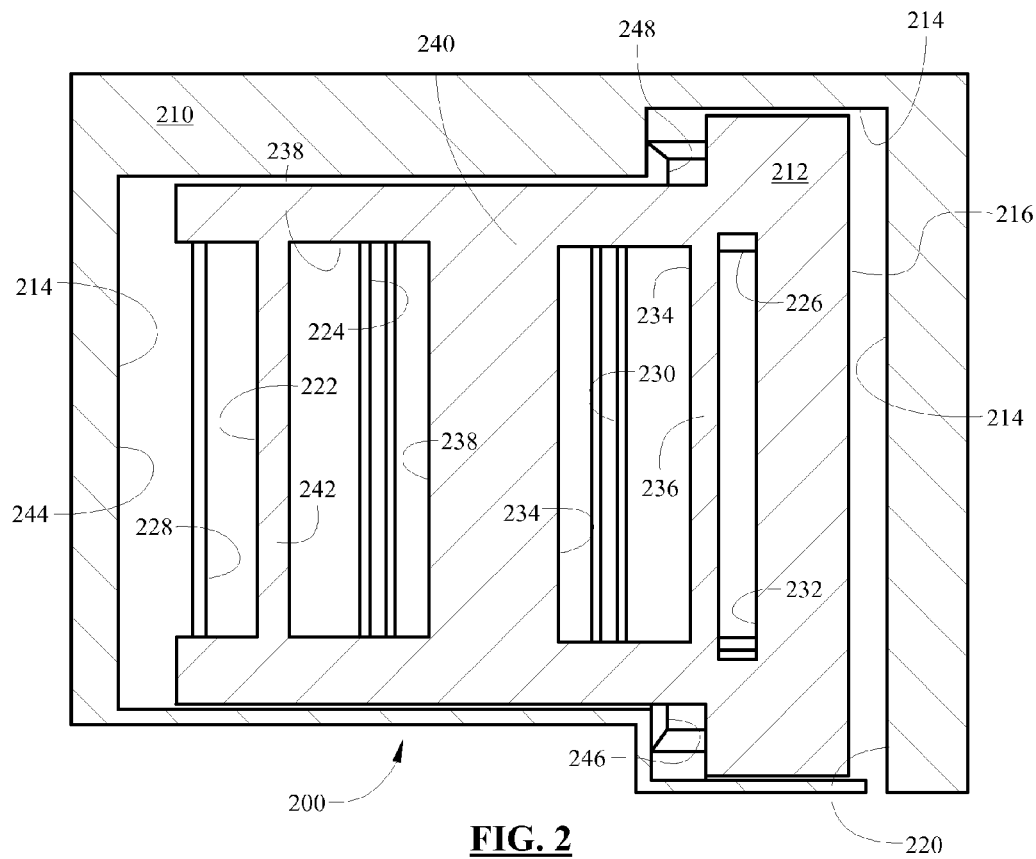
FIG. 2 is a schematic cross-sectional view of a MEMS spool valve which may be used alone or in conjunction with the MEMS microvalve actuator shown in FIG. 1.

Referring now to FIG. 2 with continued reference to FIG. 1, there is shown a schematic cross-sectional view of a MEMS based regulator valve, hereinafter referred to as a MEMS-based spool valve 200. The MEMS-based spool valve 200 shown and described herein is an exemplary embodiment of a MEMS based regulator valve. As such, the scope of the claims is not limited to the MEMS based regulator valve shown and described in detail below. The MEMS-based spool valve 200 includes a housing or body 210. The MEMS-based spool valve 200 may be formed from several layers of material, such as several semi-conductor wafers. The body 210 may also be formed from multiple layers. For example, and without limitation, the cross-sectioned portions shown may be taken through a middle layer to show the body 210 of the MEMS-based spool valve 200, with two other layers existing behind and in front of (relative to the view in FIG. 2) the middle layer shown.

The MEMS-based spool valve 200 includes a slider 212 configured to be movable to the left and to the right (as viewed in FIG. 2) within a cavity 214 defined by the body 210. The slider 212 is actuated by fluid pressure on a piloted surface 216, which is in fluid communication with a piloted chamber 220 of the cavity 214. Selective variation of pressure within the piloted chamber 220 alters the force applied to the piloted surface 216. The piloted chamber 220 may be in fluid communication with a pilot signal, such as the pilot signal produced by the pilot port 120 of the MEMS microvalve 100 shown in FIG. 1.

The slider 212 is formed with an elongated plate having a pair of oppositely disposed arms extending perpendicularly at a first end of the body so that the slider 212 is generally a T-shape, having the piloted surface 216 at a wider longitudinal end of the slider 212, and a counter surface 222 at a relatively narrower opposing longitudinal end of the slider 212. The cavity 214 is also generally a T-shape.

The body 210 defines a number of ports connecting with the cavity 214, some of which may be formed in cross-sectioned layers and some of which may be formed in other layers. The ports include a supply port 224, which is adapted to be connected to a source of high pressure fluid, such as a transmission pump (generally shown at 368 in FIG. 3). The supply port 224 may be connected to the same source of high-pressure fluid as the inlet port 116 of the MEMS microvalve 100 shown in FIG. 1. The body 210 also defines a tank port 226, which is connected to a low-pressure reservoir or fluid return (not shown). The tank port 226 may be connected to the same source of low-pressure fluid as the outlet port 118 of the MEMS microvalve 100 shown in FIG. 1.

A first load port 228 and a second load port 230 are formed in the body and communicate with the cavity 214. The first load port 228 and the second load port 230 are disposed on opposite sides of the supply port 224. The first load port 228 and the second load port 230 are adapted to be connected together to supply pressurized fluid to a hydraulically-operated component of the transmission or powertrain, as described herein. Additional ports, channels, or troughs (not viewable in FIG. 2) may be formed on the upper surface of the cavity 214 opposite the first load port 228 and the tank port 226. The additional troughs help balance flow forces acting on the slider 212.

The slider 212 shown includes three openings therethrough. A first opening 232, close to the piloted surface 216, is defined through the slider 212 to permit the fluid volume to equalize through the trough above the tank port 226 with the pressure at the tank port 226, balancing forces acting vertically (into and out of the view shown in FIG. 2) on the slider 212. A second opening 234 through the slider 212 forms an internal volume that is always in communication with the second load port 230.

A web 236 between the second opening 234 and the first opening 232 permits or prevents flow between the second load port 230 and the tank port 226 depending upon the position of the slider 212. In the illustrated position, the web 236 prevents flow between the second load port 230 and the tank port 226. When the web 236 moves to the right (as viewed in FIG. 2), a fluid pathway between the second load port 230 and the tank port 226 is opened, venting any pressure present at the second load port 230 to the low pressure reservoir connected to the tank port 226.

A third opening 238 through the slider 212 permits the fluid volume in the trough above the first load port 228 to equalize with the pressure at the first load port 228, balancing forces acting vertically (into and out of the view shown in FIG. 2) on the slider 212. A web 240 between the second opening 234 and the third opening 238 prevents flow between the supply port 224 and the second load port 230 in all positions of the slider 212.

A web 242 between the third opening 238 and the counter surface 222 permits or prevents flow between the supply port 224 and the first load port 228, depending upon the position of the slider 212. In the illustrated position, the web 242 prevents flow between the supply port 224 and the first load port 228. When the slider 212 moves to the left (as viewed in FIG. 2), a fluid pathway opens between the supply port 224 and the first load port 228, supplying pressurized fluid to the load connected to the first load port 228.

The slider 212 cooperates with the walls of the cavity 214 to define the piloted chamber 220 between the piloted surface 216 and the opposing wall of the cavity 214. A counter chamber 244 is defined between the counter surface 222 and the opposing wall of the cavity 214. The counter chamber 244 is in fluid communication with the first load port 228 at all times. Additionally, two volumes 246 and 248 may be defined between respective pairs of shoulders of the T-shaped plate forming the slider 212 and the shoulders of the T-shaped cavity 214. The volumes 246 and 248 are in communication with the tank port 226 at all times. In this manner, a hydraulic lock of the slider 212 is prevented.

The total area of the piloted surface 216 of the slider 212 is larger than the total area of the counter surface 222 of the slider 212. Therefore, when the pressures in the piloted chamber 220 and the counter chamber 244 are equal, the resultant unbalanced net force acting on the slider 212 will urge the slider 212 to the left (as viewed in FIG. 2).

Referring to FIG. 3, a vehicle is shown schematically at 320. The vehicle 320 includes a powertrain 322. The powertrain 322 includes an engine 324, a wet dual clutch transmission 326 and a differential 328. The engine 324 is configured for producing a torque. The engine 324 may include, but is not limited to, an internal combustion engine 324. The transmission 326 increases the overall operating speed range of the vehicle 320 by permitting the engine 324 to operate through its torque range a number of times. The differential 328 receives the torque from the transmission 326 and directs it to at least one drive wheel of the vehicle 320.

The wet dual clutch transmission 326 includes a gearbox assembly 330. The gearbox assembly 330 includes a plurality of gears 332 moveable between a plurality of odd gear ratios and a plurality of even gear ratios. The odd gear ratios may include a first gear ratio 334, a third gear ratio 336, and a fifth gear ratio 338. The even gear ratios may include a second gear ratio 340, a fourth gear ratio 342 and a sixth gear ratio 344. The wet dual clutch transmission 326 further includes a clutch assembly 346. The clutch assembly 346 is disposed between the engine 324 and the gearbox assembly 330. The clutch assembly 346 transfers the torque from the engine 324 to the gearbox assembly 330. The clutch assembly 346 includes a first clutch 348 and a second clutch 350. The first clutch 348 is configured for driving the plurality of gears 332 when the gearbox is disposed in the odd gear ratios. The second clutch 350 is configured for driving the plurality of gears 332 when the gearbox is disposed in the even gear ratios. A hollow shaft 352 may connect the second clutch 350 to the even gears 332, and a solid shaft 354 may connect the first clutch 348 to the odd gears 332. The solid shaft 354 and the hollow shaft 352 are concentric with each other, with the solid shaft 354 disposed within a longitudinal bore of the hollow shaft 352.

The first clutch 348 and the second clutch 350 are both wet clutches. Accordingly, the first clutch 348 may be referred to as the first wet clutch 348, and the second clutch 350 may be referred to as the second wet clutch 350. The first clutch 348 and the second clutch 350 each include multi-plate clutches that are bathed in oil to lubricate and cool the multiple plates of the first clutch 348 and the second clutch 350.

Each of the first clutch 348 and the second clutch 350 are actuated by a hydraulic piston (not shown). Accordingly, each of the first clutch 348 and the second clutch 350 are hydraulic components of the wet dual clutch transmission 326. Upon receiving a hydraulic signal, the hydraulic piston of the first clutch 348 or the second clutch 350 compresses the multiple plates to connect an input shaft 356 from the engine 324 with either the solid shaft 354 or the hollow shaft 352, thereby transmitting torque to the gearbox. In operation, hydraulic pressure is applied to one of the first clutch 348 and the second clutch 350 as hydraulic pressure is being released from the other of the first clutch 348 and the second clutch 350 to shift torque transfer between the solid shaft 354 and the hollow shaft 352, thereby allowing the gearbox to shift between an even gear ratio and an odd gear ratio.

The wet dual clutch transmission 326 includes a lube regulating valve 358. The lube regulating valve 358 controls the flow of fluid to the clutch assembly 346 that is used to lubricate and/or cool the first clutch 348 and the second clutch 350. Accordingly, the lube regulating valve 358 is a hydraulic component of the wet dual clutch transmission 326. The lube regulating valve 358 increases or decreases fluid flow to the clutch assembly 346 based upon a hydraulic signal.

The wet dual clutch transmission 326 may further include one or more on/off solenoids. The on/off solenoids are hydraulically actuated devices that control and/or actuate another device. The on/off solenoid is actuated by a hydraulic signal, and is therefore a hydraulic component of the wet dual clutch transmission 326. For example, the wet dual clutch transmission 326 may include a first on/off solenoid 360 coupled to the first clutch 348 to control actuation of the hydraulic piston of the first clutch 348, and a second on/off solenoid 362 coupled to the second clutch 350 to control actuation of the hydraulic piston of the second clutch 350. It should be appreciated that the on/off solenoid may be operably connected to some other component of the wet dual clutch transmission 326.

The wet dual clutch transmission 326 may further include at least one synchronizing shift fork 364. The synchronizing shift fork 364 moves at least one gear into and/or out of meshing engagement to connect and disconnect the various gear ratios. For clarity, only one synchronizing shift fork 364 is shown. However, it should be appreciated that the wet dual clutch transmission 326 may include multiple synchronizing shift forks 364 for moving the multiple gears 332. The synchronizing shift fork 364 is actuated by a hydraulic signal. Therefore, the synchronizing shift fork 364 is a hydraulic component of the wet dual clutch transmission 326.

The wet dual clutch transmission 326 may further include a line pressure control valve 366. The line pressure control valve 366 controls and/or directs a supply of pressurized fluid from a transmission pump 368 to one or more hydraulic components of the wet dual clutch transmission 326. Accordingly, the line pressure control valve 366 is in fluid communication with the transmission pump 368, and also with one or more of the hydraulic components of the wet dual clutch transmission 326. The line pressure control valve 366 may regulate pressure and/or flow to the various different hydraulic components of the wet dual clutch transmission 326. For example, the line pressure control valve 366 may increase or decrease fluid pressure to one or both of the first clutch 348 and the second clutch 350, or may increase or decrease fluid pressure to the lube regulating valve 358.

FIGS. 4-7 each show a schematic box diagram of a different pressure control systems for hydraulic component of the wet dual clutch transmission shown in FIG. 3. Each of the different options for the pressure control system shown in FIGS. 4 through 7 utilize a MEMS based device to actuate and/or control any of the plurality of components of the wet dual clutch transmission. The MEMS based device may act as an on/off controller to provide a discrete signal, or may act as a variable pressure controller to provide variable control of the hydraulic components of the wet dual clutch transmission 326. Specifically, the hydraulically-controlled component may include but is not limited to the clutch assembly 346, the first clutch 348, the second clutch 350, the lube regulating valve 358, the on/off solenoids 360, 362, the line pressure control valve 366, and the synchronizing shift fork 364. In some embodiments of the powertrain 322, the hydraulically-controlled component may actually be two or more of these components. Furthermore, additional pressure control system options may be created by combining the various MEMS devices discussed with other MEMS devices and metal valves.

Figure 4:
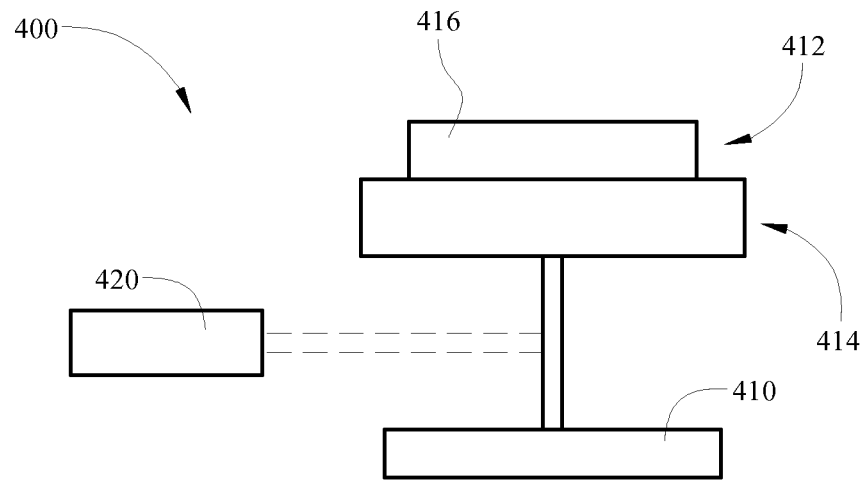
FIG. 4 is a schematic box diagram of a first option for pressure control system for a hydraulic-controlled component within a transmission.

Referring to FIG. 4 with continuing reference to FIGS. 1 and 3, a first option for a pressure control system for a hydraulically-actuated component 410 is generally indicated at 400. The hydraulically-actuated component 410 may include but is not limited to any of the components of the wet dual clutch transmission 326 described above and shown in FIG. 3, including the clutch assembly 346, the first clutch 348, the second clutch 350, the lube regulating valve 358, the on/off solenoids 360, 362, the line pressure control valve 366, and the synchronizing shift fork 364. The first option 400 includes a pilot valve 412 controlling a regulating valve 414. The regulating valve 414 is operably connected to the pilot valve 412 and the hydraulic component 410. Accordingly, the regulaing valve 414 is in fluid communication with the pilot valve 412 and is configured to direct fluid to the hydraulic component 410 when actuated by the pilot valve 412.

The pilot valve 412 includes a first valve 416 producing a pilot signal. The regulating valve 414 is configured to receive the pilot signal. The regulating valve 414 is also configured to output a control signal which controls the hydraulically-actuated component 410.

In the first option 400 shown in FIG. 4, the first valve 416 may include but is not limited to a MEMS based device such as the MEMS microvalve 100 shown in FIG. 1, and the regulating valve 414 may include but is not limited to a MEMS based device such as the MEMS-based spool valve 200. Therefore, as described herein, the MEMS microvalve 100 produces the pilot signal and communicates through the pilot port 120 to the piloted chamber 220 of the MEMS-based spool valve 200. The first valve 416 and the second valve 414 may be directly attached to the hydraulically actuated component 410, or may be remotely located from the hydraulically actuated component 410. For example, the first valve 416 and the second valve 414 may be located in a valve body (not shown) of the wet dual clutch transmission.

As shown in FIGS. 1 and 2, when the MEMS microvalve 100 shown in FIG. 1 is combined with the MEMS-based spool valve 200, either by attaching the two directly together or by fluidly connecting the pilot port 120 and piloted chamber 220, the MEMS microvalve 100 acts on the MEMS-based spool valve 200 to alter the fluid flow and pressure to the first load port 228 and the second load port 230.

The inlet port 116 in the MEMS microvalve 100 is relatively small in comparison to the supply port 224 and the first load port 228 of the MEMS-based spool valve 200. In combined operation, the beam 112 of the MEMS microvalve 100 uncovers the inlet port 116, and fluid flows through the inlet port 116, the first chamber 122, and the outlet orifice 124 to the outlet port 118. The inlet port 116 may act as an additional orifice in this flow path.

Due to possible pressure drop through the inlet port 116, it may not be possible to get the pressure in the piloted chamber 220 of the MEMS-based spool valve 200 up to the pressure provided by the high-pressure fluid source. The pressure in the counter chamber 244 may achieve a higher pressure (at or near pump outlet pressure) than may be achieved in the piloted chamber 220, owing to the larger openings of the supply port 224 and the first load port 228 of the MEMS-based spool valve 200, and resultant low pressure drop when fluid flows through these ports. However, because the surface area of the piloted surface 216 is greater than the surface area of the counter surface 222, the slider 212 can still be moved leftward (as viewed in FIG. 2) even if the pressure in the piloted chamber 220 acting on the piloted surface 216 is less than the pressure in the counter chamber 244.

The MEMS-based spool valve 200 has three principal zones or positions of operation: a pressure increase position, a pressure hold position, and a pressure decrease position. The MEMS-based spool valve 200 is shown in FIG. 2 in the pressure hold position, such that the MEMS-based spool valve 200 is holding pressurized fluid on the hydraulically-actuated component 410 (the load).

If the slider 212 is moved rightward (as viewed in FIG. 2), the MEMS-based spool valve 200 is in the pressure decrease position. This is accomplished when the ECU commands the MEMS microvalve 100 to close, by increasing electric current supplied to the actuator 114. The first and second ribs 132 and 134 of the actuator 114 expand, causing the beam 112 to pivot counter-clockwise (bending the flexure pivot 126) and cover more of the inlet port 116. Flow decreases through the first chamber 122 from the inlet port 116 to the outlet port 118. The pressure drop across the outlet orifice 124 decreases.

Pressure in the first chamber 122 and the pilot port 120 also decreases. Because the pilot port 120 is in direct fluid communication with the piloted chamber 220, this results in an imbalance of the forces acting on the slider 212. The decreased force acting on the piloted surface 216 (due to the lowered pressure in the piloted chamber 220) is now less than the unchanged force acting on the counter surface 222 due to the pressure in the counter chamber 244 (connected to the load).

The force imbalance urges the slider 212 of the MEMS-based spool valve 200 to the right (as viewed in FIG. 2). The web 236 is thus moved rightward, permitting flow of pressurized fluid from the hydraulically-actuated component 410, through the second load port 230 and through the second opening 234 in the slider 212. From there, some of the flow passes directly out of the tank port 226, while some flow may pass up into the trough above the tank port 226, over the top of the web 236, down through the first opening 232 and out the tank port 226. In this manner, pressure is released from the hydraulically-actuated component 410 and vented to the low pressure reservoir connected to the tank port 226.

The slider 212 of the MEMS-based spool valve 200 will move back to the pressure hold position when the pressure in the counter chamber 244 (acting through the first load port 228) is decreased sufficiently that forces acting on the slider 212 urge the slider 212 to move to the left (as viewed in FIG. 2). With forces equalized, the slider 212 of the MEMS-based spool valve 200 will stop in the pressure hold position. Thus, the pressure at the load (as sensed through the first load port 228 and the second load port 230) will be proportionate to the electrical signal (current) supplied to the actuator 114.

To move the MEMS-based spool valve 200 into the pressure increase position, the ECU decreases current flow through the ribs of the actuator 114 and the beam 112 of the MEMS microvalve 100 pivots clockwise to uncover more of the inlet port 116. This results in a pressure increase in the piloted chamber 220, while the pressure in the counter chamber 244 remains constant. The slider 212 is moved leftward (as viewed in FIG. 2) due to the resultant imbalance of forces acting on the slider 212. If the MEMS-based spool valve 200 was in the pressure decrease position, the leftward movement moves the slider valve back to the pressure hold position shown in FIG. 2.

If the ECU further decreases current flow and causes the MEMS microvalve 100 to open further, the pressure in the piloted chamber 220 further increases, urging the slider 212 of the MEMS-based spool valve 200 further leftward (as viewed in FIG. 2) into the pressure increase position. The web 242 is moved leftward, permitting flow of pressurized fluid from the supply port 224 through the third opening 238 in the slider 212. From the third opening 238, some of the flow passes directly out of the first load port 228, while some flow may pass up into the trough over the top of the web 242, through the second counter chamber 244 and out of the first load port 228. In this manner, pressure is directed from the source of high-pressure fluid connected to the supply port 224 and applied to the load connected to the first load port 228 (e.g., the hydraulically-actuated component 410).

While the pilot signal produced by the MEMS microvalve 100 may directly control the hydraulically-actuated component 410, the control signal produced by the MEMS-base spool valve 200 increases the pressure and flow characteristics of the control signal to provide more robust control of and quicker response of the hydraulically-actuated component 410.

As also shown in FIG. 4, the first option 400 may further include a pressure sensor. The pressure sensor may include but is not limited to a MEMS pressure transducer 420. The MEMS pressure transducer 420 is optional. However, when used, the MEMS pressure transducer 420 is configured to sense the pressure profile of the control signal from the regulating valve 414. The ECU, or other controller is configured to receive input from the MEMS pressure transducer 420 and to provide output to the MEMS microvalve 100 in the pilot valve 412 to regulate the system pressure in response to input from the MEMS pressure transducer 420. Therefore, with the MEMS pressure transducer 420 and the controller, the first option 400 may be configured for closed-loop feedback and adjustment of the control signal sent to the hydraulically-actuated component 410.

Figure 5:
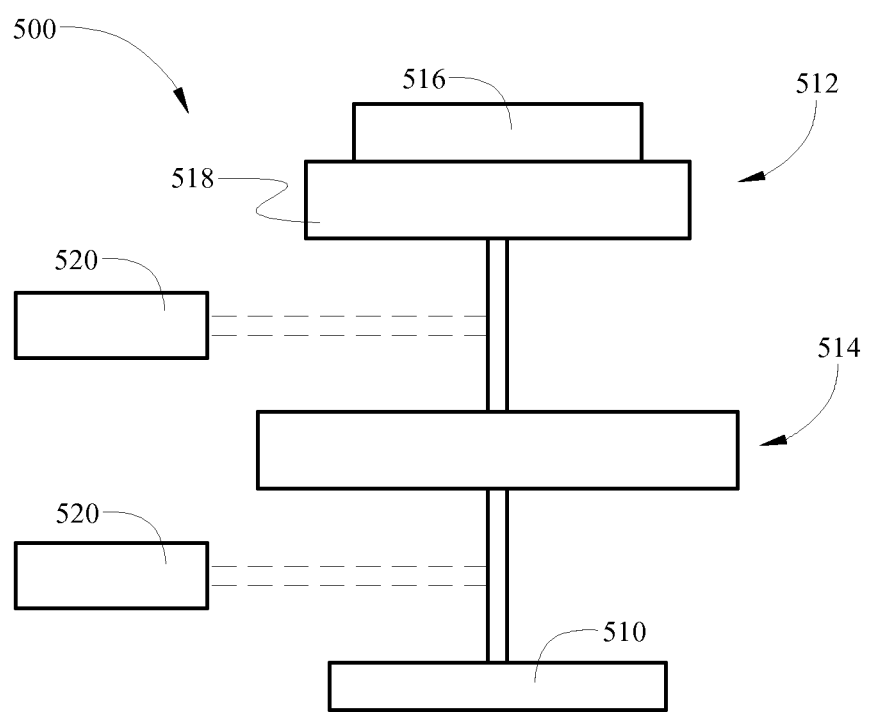
FIG. 5 is a schematic box diagram of a second option for pressure control system for the hydraulic-controlled component within the transmission.

Referring to FIG. 5 with continued reference to FIGS. 1 through 3, a second option for a pressure control system for the hydraulically-actuated component 510 is generally shown at 500. The hydraulically-actuated component 510 may include but is not limited to any of the components of the wet dual clutch transmission 326 described above and shown in FIG. 3, including the clutch assembly 346, the first clutch 348, the second clutch 350, the lube regulating valve 358, the on/off solenoids 360, 362, the line pressure control valve 366, and the synchronizing shift fork 364. The second option 500 includes a pilot valve 512 controlling a regulating valve 514. The regulating valve 514 is operably connected to the pilot valve 512 and the hydraulic component 510. Accordingly, the regulator valve 514 is in fluid communication with the pilot valve 512 and is configured to direct fluid to the hydraulic component 510 when actuated by the pilot valve 512.

The pilot valve 512 includes a first valve 516 producing a pilot signal. However, unlike the first option 400 shown in FIG. 4, in the second option 500, the pilot valve 512 also includes a second valve 518, which steps up, or amplifies, the pilot signal to an amplified pilot signal. The regulating valve 514 is configured to receive the amplified pilot signal. The regulating valve 514 is also configured to output a control signal, which controls the hydraulically-actuated component 510.

In the second option 500 shown in FIG. 5, the first valve 516 may include but is not limited to a MEMS based device such as the MEMS microvalve 100 shown in FIG. 1, and the second valve 518 may include but is not limited to a MEMS based device such as the MEMS-based spool valve 200 shown in FIG. 2. Therefore, as already described herein, the MEMS microvalve 100 selectively produces the pilot signal and communicates through the pilot port 120 to the piloted chamber 220 of the MEMS-based spool valve 200. However, with the second option 500, the output of the MEMS-based spool valve 200 is the amplified pilot signal, which is then used by the regulating valve 514. The first valve 516 and the second valve 518 may be directly attached to the hydraulically actuated component 510, or may be remotely located from the hydraulically actuated component 510. For example, the first valve 516 and the second valve 518 may be located in a valve body (not shown) of the wet dual clutch transmission 326.

In the second option 500 shown in FIG. 5, the regulating valve 514 is a conventional mechanical regulating valve. Generally, the conventional mechanical regulating valve is a regulating valve produced by mechanical machining processes. Based upon the amplified pilot signal provided by the pilot valve 512, the conventional mechanical regulating valve provides the control signal for the hydraulically-actuated component 510.

The pilot signal produced by the first valve 516 (the MEMS microvalve 100) of the pilot valve 512 may directly pilot the conventional mechanical regulating valve or directly control the hydraulically-actuated component 510. However, the amplified pilot signal produced by the pilot valve 512 (including both the first valve 516 and the second valve 518) increases the pressure and flow characteristics of the control signal to provide more robust control of and quicker response of the conventional mechanical regulating valve, which controls the hydraulically-actuated component 510. The conventional mechanical regulating valve further increases the pressure and flow characteristics used to control the hydraulically-actuated component 510, as compared to the first option 400 shown in FIG. 4.

Similar to the first option shown in FIG. 4, the second option 500 may further include one or more pressure sensors.

The pressure sensor may include but are not limited to a MEMS pressure transducers 520. The MEMS pressure transducers 520 are optional. However, when used, the MEMS pressure transducers 520 are configured to sense the pressure profile of the amplified pilot signal from the pilot valve 512 or of the control signal from the regulating valve 514. In most configurations, only one of the MEMS pressure transducers 520 will be used. If used to sense the pressure profile of the pilot signal, the MEMS pressure transducer 520 may be packaged into a single package along with the MEMS microvalve 100 and the MEMS-based spool valve 200 for the pilot valve 512.

The ECU, or other controller is configured to receive input from one of the MEMS pressure transducers 520 and to provide output to the MEMS microvalve 100 in the pilot valve 512 to regulate the system pressure in response to input from one of the MEMS pressure transducers 520. Therefore, the MEMS pressure transducers 520 provide closed-loop feedback and adjustment of the control signal sent to the hydraulically-actuated component 510.

Figure 6:
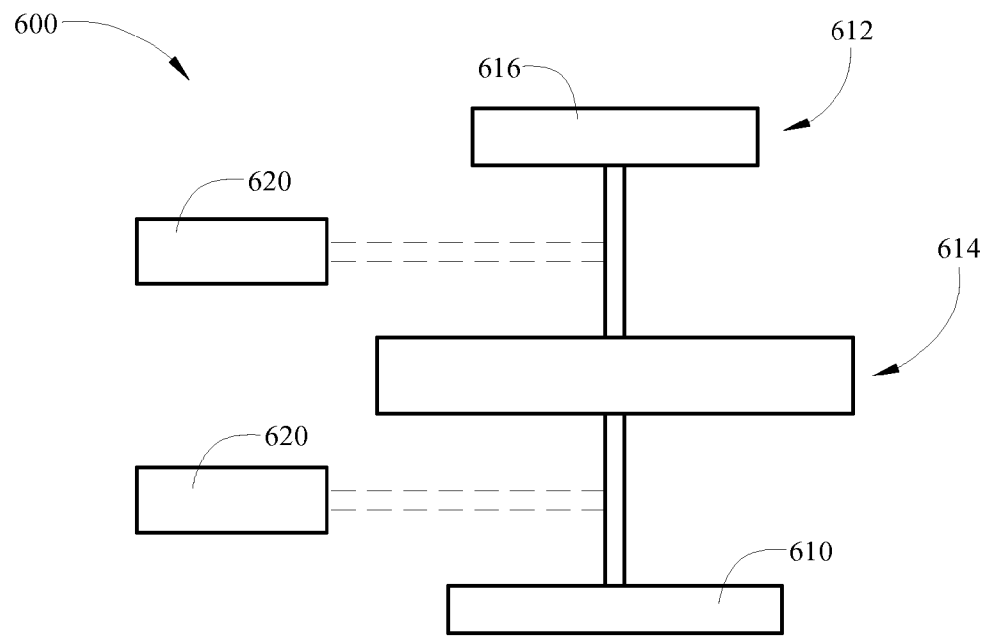
FIG. 6 is a schematic box diagram of a third option for pressure control system for a third hydraulic component within the transmission.

Referring to FIG. 6 with continued reference to FIGS. 1 through 3, a third option 600 for a pressure control system for a hydraulically-actuated component 610 is generally indicated at 600. The hydraulically-actuated component 610 may include but is not limited to any of the components of the wet dual clutch transmission 326 described above and shown in FIG. 3, including the clutch assembly 346, the first clutch 348, the second clutch 350, the lube regulating valve 358, the on/off solenoids 360, 362, the line pressure control valve 366, and the synchronizing shift fork 364. The third option 600 includes a pilot valve 612 controlling a regulating valve 614. The regulating valve 614 is operably connected to the pilot valve 612 and the hydraulic component 610. Accordingly, the regulator valve 614 is in fluid communication with the pilot valve 612 and is configured to direct fluid to the hydraulic component 610 when actuated by the pilot valve 612.

The pilot valve 612 includes a first valve 616 producing a pilot signal. The regulating valve 614 is configured to receive the pilot signal. The regulating valve 614 is also configured to output a control signal, which controls the hydraulically-actuated component 610.

In the third option 600 shown in FIG. 6, the first valve 616 may include but is not limited to a MEMS based device such as the MEMS microvalve 100 shown in FIG. 1. Therefore, unlike the first option 400 shown in FIG. 4 and in the second option 500 shown in FIG. 5, the first valve 616 communicates the pilot signal directly to the regulating valve 616, which is a small mechanical spool valve. The first valve 616 may be directly attached to the hydraulically actuated component 610, or may be remotely located from the hydraulically actuated component 610. For example, the first valve 616 and the regulating valve 616 may be located in a valve body (not shown) of the wet dual clutch transmission 326.

Generally, the small mechanical spool valve is a regulating valve produced by mechanical machining processes, but on a smaller scale than the conventional mechanical regulating valve. Based upon the (un-amplified) pilot signal provided by the pilot valve 612, the small mechanical spool valve provides the control signal for the hydraulically-actuated component 610. Compared to the conventional mechanical regulating valve used in the second option 500 shown in FIG. 5, the small mechanical spool valve is, for example, on the order of half the size of the conventional mechanical regulating valve.

The pilot signal produced by the pilot valve 612 (including only the MEMS microvalve 100) may directly control the hydraulically-actuated component 610. However, the amplified control signal produced by the regulator valve 616 increases the pressure and flow characteristics of the control signal to provide more robust control of and quicker response of the small mechanical spool valve used for the regulating valve 614. The small mechanical spool valve may then control the hydraulically-actuated component 610.

The third option 600 may further include one or more pressure sensors. The pressure sensors may include but are not limited to a MEMS pressure transducer 620. The MEMS pressure transducers 620 are again optional. However, when used, the MEMS pressure transducers 620 are configured to sense the pressure profile of the pilot signal from the pilot valve 612 or of the control signal from the regulating valve 614. In most configurations, only one of the MEMS pressure transducers 620 will be used. If used to sense the pressure profile of the pilot signal, the MEMS pressure transducer 620 may be packaged into a single package along with the MEMS microvalve 100 for the pilot valve 612.

The ECU, or other controller is configured to receive input from one of the MEMS pressure transducers 620 and to provide output to the MEMS microvalve 100 in the pilot valve 612 to regulate the system pressure in response to input from one of the MEMS pressure transducers 620. Therefore, the MEMS pressure transducers 620 provide closed-loop feedback and adjustment of the control signal sent to the hydraulically-actuated component 610.

Figure 7:
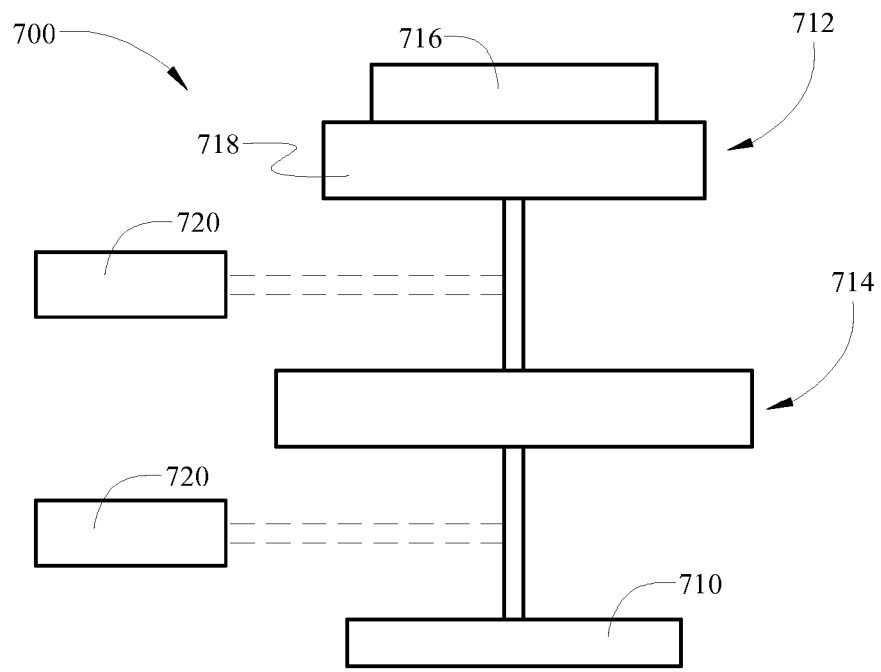
FIG. 7 is a schematic box diagram of a fourth option for pressure control system for a fourth hydraulic component within the transmission.

Referring to FIG. 7 with continued reference to FIGS. 1 through 3, a fourth option for a pressure control system for a hydraulically-actuated component 710 is generally indicated at 700. The hydraulically-actuated component 710 may include but is not limited to any of the components of the wet dual clutch transmission 326 described above and shown in FIG. 3, including the clutch assembly 346, the first clutch 348, the second clutch 350, the lube regulating valve 358, the on/off solenoids 360, 362, the line pressure control valve 366, and the synchronizing shift fork 364. The fourth option 700 includes a pilot valve 712 controlling a regulating valve 714. The regulating valve 714 is operably connected to the pilot valve 712 and the hydraulic component 710. Accordingly, the regulator valve 714 is in fluid communication with the pilot valve 712 and is configured to direct fluid to the hydraulic component 710 when actuated by the pilot valve 712.

The pilot valve 712 includes a first valve 716 producing a pilot signal. Similar to the second option 500 shown in FIG. 5, the pilot valve 712 also includes a second valve 718, which steps up, or amplifies, the pilot signal to an amplified pilot signal. The regulating valve 714 is again configured to receive the amplified pilot signal and the regulating valve 714 is configured to output a control signal, which controls the hydraulically-actuated component 710.

In the fourth option 700 shown in FIG. 7, the first valve 716 may include but is not limited to a MEMS based device such as the MEMS microvalve 100 shown in FIG. 1, and the second valve 718 may include but is not limited to a small mechanical spool valve. Generally, the small mechanical spool valve is a regulating valve produced by mechanical machining processes, but on a smaller scale than the conventional mechanical regulating valve. Based upon the (un-amplified) pilot signal provided by the first valve 716, the small mechanical spool valve provides the control signal for the regulating valve 714. Compared to the conventional mechanical regulating valve used in the second option 500 shown in FIG. 5, the small mechanical spool valve is, for example, on the order of half of the size of the conventional mechanical regulating valve.

In the fourth option 700 shown in FIG. 7, the regulating valve 714 is again a conventional mechanical regulating valve. Based upon the amplified pilot signal provided by the pilot valve 712, which includes both the MEMS microvalve 100 and the small mechanical spool valve, the conventional mechanical regulating valve provides the control signal for the hydraulically-actuated component 710.

Accordingly, the MEMS microvalve 100 selectively produces the pilot signal and communicates through the pilot port 120 to the small mechanical spool valve. However, with the fourth option 700, the output of the small mechanical spool valve is the amplified pilot signal, which is then used by the regulating valve 714. In the fourth option 700, the small mechanical spool valve functions similarly to the MEMS-based spool valve 200 used as the second valve 518 in the second option 500 shown in FIG. 5. However, the small mechanical spool valve used as the second valve 718 for the fourth option 700 may be at least 100 times larger than the MEMS-based spool valve 200 used for the second valve 518 in the second option 500.

The pilot signal produced by the first valve 716 alone (the MEMS microvalve 100) may directly pilot the conventional mechanical regulating valve or directly control the hydraulically-controlled component 710. However, the amplified pilot signal produced by the pilot valve 712 (including both the first valve 716 and the second valve 718) increases the pressure and flow characteristics of the control signal to provide more robust control of and quicker response of the conventional mechanical regulating valve, which controls the hydraulically-controlled component 710. The conventional mechanical regulating valve further increases the pressure and flow characteristics used to control the hydraulically-controlled component 710.

The fourth option 700 may further include one or more pressure sensors. The pressure sensors may include but are not limited to a MEMS pressure transducer 720. The MEMS pressure transducers 720 are again optional. However, when used, the MEMS pressure transducers 720 are configured to sense the pressure profile of the pilot signal from the pilot valve 712 or of the control signal from the regulating valve 714. In most configurations, only one of the MEMS pressure transducers 720 will be used.

The ECU, or other controller is configured to receive input from one of the MEMS pressure transducers 720 and to provide output to the MEMS microvalve 100 in the pilot valve 712 to regulate the system pressure in response to input from one of the MEMS pressure transducers 720. Therefore, the MEMS pressure transducers 720 provide closed-loop feedback and adjustment of the control signal sent to the hydraulically-actuated component 710.

While the best modes for carrying out the invention have been described in detail, those familiar with the art to which this invention relates will recognize various alternative designs and embodiments for practicing the invention within the scope of the appended claims.

The invention claimed is:

1. A wet dual clutch transmission for a vehicle, the wet dual clutch transmission comprising:
a hydraulic component;
a pilot valve assembly including a first valve portion and a second valve portion, wherein the first valve portion includes a micrometer sized micro-electro-mechanical systems (MEMS) pilot microvalve, and wherein the second valve portion includes a small mechanical spool valve that is larger than a micrometer sized spool valve; and
a regulating valve operably connected to the pilot valve assembly and the hydraulic component and operable to direct fluid to the hydraulic component when actuated by the pilot valve assembly;
wherein the first valve portion of the pilot valve assembly outputs an unamplified pilot signal, which is amplified by the second valve portion of the pilot valve assembly to define an amplified pilot signal, with the regulating valve receiving the amplified pilot signal and outputting a control signal to control the hydraulic component.

2. A wet dual clutch transmission as set forth in claim 1, wherein the MEMS pilot microvalve of the pilot valve assembly includes a micrometer sized MEMS pressure differential actuator valve.

3. A wet dual clutch transmission as set forth in claim 1, wherein the regulating valve includes a spool valve.

4. A wet dual clutch transmission as set forth in claim 1, wherein the hydraulic component includes at least one of a clutch assembly, a lube regulating valve, an on/off solenoid, a synchronizing shift fork, and a line pressure control valve.

5. A wet dual clutch transmission as set forth in claim 1 further comprising a gearbox assembly including a plurality of gears moveable between a plurality of even gear ratios and a plurality of odd gear ratios, wherein the hydraulic component includes a clutch assembly having a first wet clutch and a second wet clutch, wherein the first wet clutch is configured for driving the plurality of gears when the gearbox is disposed in the odd gear ratios, and wherein the second wet clutch is configured for driving the plurality of gears when the gearbox is disposed in the even gear ratios.

6. A wet dual clutch transmission as set forth in claim 5 wherein the first clutch and the second clutch are wet clutches bathed in oil.

7. A wet dual clutch transmission as set forth in claim 1, further comprising a pressure sensor operably disposed between the regulating valve and the hydraulic component for sensing a fluid pressure of the controls signal.

8. A wet dual clutch transmission as set forth in claim 7, wherein the pressure sensor includes a micrometer sized MEMS pressure transducer.

9. A wet dual clutch transmission as set forth in claim 7 further comprising a second pressure sensor operably disposed between the pilot valve assembly and the regulating valve for sensing a fluid pressure of the amplified pilot signal, wherein the second pressure sense includes a micrometer sized MEMS pressure transducer.

10. A wet dual clutch transmission as set forth in claim 1 wherein the small mechanical spool valve is at least 100 times larger than a micrometer sized MEMS device.

* * * * *